Patented Mar. 31, 1953

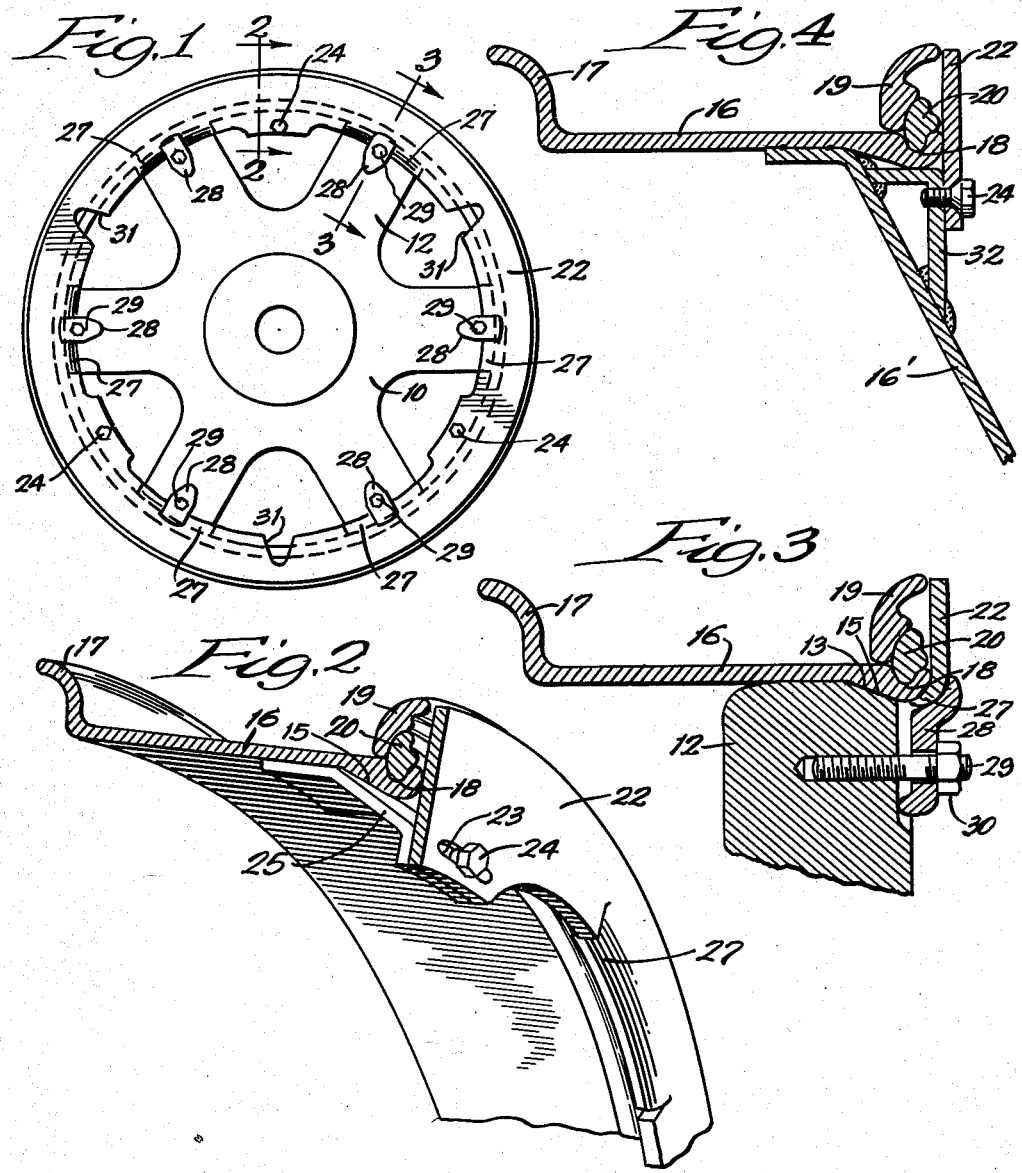

2,633,178

UNITED STATES PATENT OFFICE 2,633,178

WHEEL RIM ASSEMBLY

Ansel A. Leaf, Muskegon, Mich.

Application July 15, 1948, Serial No. 38,809

5 Claims. (Cl. 152—405)

This invention is directed to wheel rim assemblies for pneumatic tires.

Wheel rim assemblies for pneumatic tires, particularly for trucks and busses include a rim base and a side ring secured thereto for mounting the pneumatic tire thereon. Locking means are provided for removably locking the side ring to the rim base. Such locking means take various forms. For example, in one form, known as the two piece rim assembly, the rim base is provided with a groove for receiving the side ring and when the side ring is properly centered with respect to the rim base, it is locked in place thereon. In another form, known as the three piece rim assembly, the rim base is provided with a groove, the side ring is placed over the rim base adjacent the groove, and a lock ring is snapped into the groove for locking the side ring in place on the rim base.

In mounting pneumatic tires on such rims extreme care must be utilized to lock the side ring to the rim base. For example, if the side ring is not properly centered or if the locking ring is not properly located in the groove in the rim base, the side ring and locking ring are blown off the rim base with considerable force when the pneumatic tire is inflated. Blowing off of side rings and locking rings also occurs when rings of wrong size or shape are utilized or when rings become defective or sprung. A large number of accidents of this nature have been occuring for many years and in spite of warnings and instructions in connection with the mounting of tires by tire and rim manufacturers the accidents still occur.

Such accidents do not occur solely during the mounting operation but the danger is always present since the rings can become unseated through being dropped or jarred, or through cracking and breaking while in use, and often when the tire has lost some pressure, the rings become unseated and blow off upon being reinflated. The danger of accident therefore is not only directed to the mechanics mounting the tires but also to pedestrians passing in front of the truck wheels.

The principal object of this invention, therefore, is to provide a wheel rim assembly with a safety ring which overlies the side ring and locking ring so that if the rings become unlocked or unseated and are blown off they are confined by the safety ring. In accordance with this invention the pneumatic tire is mounted on the wheel rim assembly in the conventional manner and then the safety ring is secured in place before the tire is inflated. The safety ring is suitably secured as by bolts to the rim base and is thus retained on the wheel rim assembly during tire inflation and during use, thereby completely avoiding accidents caused by blowing off of the rings. This invention is equally applicable to two or three piece type rim assemblies and to rim assemblies wherein the rim base and wheel are integral or wherein the rim base is demountable from the wheel.

Further objects of this invention reside in the details of construction of the wheel rim assembly and the cooperative relationship between the component parts thereof.

Other objects of this invention will become apparent to those skilled in the art upon reference to the accompanying specification, claims and drawing in which:

Figure 1 is a side elevational view of a demountable wheel rim assembly for mounting a pneumatic tire on a wheel;

Figure 2 is a perspective sectional view taken substantially along the line 2—2 of Fig. 1;

Figure 3 is a sectional view taken substantially along the line 3—3 of Fig. 1; and Figure 4 is a sectional view showing a wheel rim assembly wherein the rim base is integral with a disc wheel.

Referring first to Figs. 1, 2 and 3, there is illustrated a conventional wheel 10 which may be of the type having spokes 12 which are provided with rim base receiving surfaces 13.

The demountable wheel rim assembly includes a rim base 16 having a spoke engaging surface 15 and a side flange 17, the rim base 16 being carried by the ends of the spokes with the surfaces 13 and 15 in engagement. The rim base 16 is provided with a groove 18 and a side ring 19 is carried by the rim base 16 adjacent the groove 18. A locking ring 20 which is of the split ring type is seated in the groove 18 for locking the side ring 19 in place. The pneumatic tire is received on the rim base 16 between the flange 17 and the side ring 19. This construction so far described is conventional in the art and is representative of one form of demountable wheel rim assembly.

In accordance with this invention there is provided a safety ring 22 which overlies the side ring 19 and locking ring 20. The safety ring 22 is provided with a plurality of holes in the form of slots 23 at spaced intervals, three of such holes being illustrated. The holes 23 are adapted to receive bolts 24 removably secured in holes in lugs 25 which are in turn secured to the rim base 16 as by spot welding. The bolts 24 and lugs 25 therefore operate to provide means for securing the safety ring to the rim base overlying the side ring 19 and locking ring 20. The holes 23 in the safety rim 22 are preferably in the form of slots to compensate for any possible misalinement in spacing of the holes, and the spacing of the holes in the lugs. Also, the slots 23 are preferably tapered and the bolts 24 are beveled to provide maximum pressure whereby accidental loosening of the bolts is prevented.

In the event, therefore, that the side rings 19 and the locking ring 20 are blown off the rim base 16 due to the pressure in the pneumatic tire, the rings will be confined by the safety ring 22 thereby avoiding injury to persons adjacent thereto.

The safety ring 22 may be provided with a plurality of curved portions 27 which follow the contour of the rim base 16. These portions 27 are adapted to be engaged by lugs 28 secured by studs 29 and nuts 30 to the spokes 12 of the wheel 10 for the purpose of demountably securing the wheel rim assembly to the wheel 10. Since the portions 27 of the safety ring 22 have a contour corresponding to that of the rim base 16, the same mounting lugs 28 may be utilized which are utilized when the safety ring is not provided. Alternatively, the safety ring 22 may be provided with openings so that the mounting lugs 28 may engage directly the rim base 16 for mounting purposes.

In order to inspect the condition of the side ring 19 and the locking ring 20 when the safety ring 22 is in place, the safety ring 22 may be provided with inspection openings 31.

The form of the invention illustrated in Figure 4 is essentially the same as illustrated in Figs. 1, 2 and 3 with the exception that the rim base is integral with the wheel as distinguished from being demountable therefrom. In this respect the rim base 16 is suitably secured to a wheel such as a disc wheel 16' by spot welding. In this arrangement the safety ring 22 may be secured to the rim base by bolts 24 carried by lugs 32 suitably secured to the member 16' as by welding.

While this invention has been illustrated in detail in connection with a three piece wheel rim assembly, it is equally applicable to a two piece assembly wherein the split locking ring is omitted.

While for purposes of illustration two forms of this invention have been disclosed, other forms thereof may become apparent to those skilled in the art upon reference to these disclosures, and therefore, this invention is to be limited only by the scope of the appended claims.

I claim as my invention:

1. A wheel rim assembly for pneumatic tires comprising, a rim base, a side ring, means for removably locking the side ring to the rim base for mounting the pneumatic tire, a safety ring overlying the side ring and having a plurality of spaced holes therein, a plurality of lugs having holes and carried by the rim base, and a plurality of bolts extending through the holes in the safety ring and lugs for securing the safety ring to the rim base to prevent removal of the side ring.

2. A wheel rim assembly for pneumatic tires comprising, a rim base having a groove, a side ring carried by the rim base adjacent the groove, a locking ring received in the groove for locking the side ring to the rim base for mounting the pneumatic tire, a safety ring overlying the locking ring and side ring and having a plurality of spaced holes therein, a plurality of lugs having holes and carried by the rim base, and a plurality of bolts extending through the holes in the safety ring and lugs for securing the safety ring to the rim base to prevent removal of the locking ring and side ring.

3. A wheel rim assembly for pneumatic tires comprising, a rim base, a side ring, means for removably locking the side ring to the rim base for mounting the pneumatic tire, a safety ring overlying the side ring and having a plurality of spaced slots therein, a plurality of lugs having holes and carried by the rim base, and a plurality of bolts extending through the slots and holes in the safety ring and lugs for securing the safety ring to the rim base to prevent removal of the side ring.

4. A demountable wheel rim assembly for mounting a pneumatic tire on a wheel having rim fastening devices comprising, a rim base adapted to be carried by the wheel, a side ring, means for removably locking the side ring to the rim base for mounting the pneumatic tire, a safety ring overlying the side ring and having portions corresponding to the contour of the rim base, and means for securing the safety ring to the rim base to prevent removal of the side ring, said portions on the safety ring being adapted to be engaged by the rim fastening devices for securing the rim assembly to the wheel.

5. A safety ring assembly, for use with a wheel rim assembly for pneumatic tires having a rim base and a side ring removably secured to the rim base, comprising a safety ring adapted to overlie the side ring and provided with securing holes, a plurality of lugs adapted to be secured to the rim base, and a plurality of bolts adapted to extend through the securing holes of the safety ring and the lugs for securing the safety ring to the rim base to prevent removal of the side ring.

ANSEL A. LEAF.

REFERENCES CITED

The following references are of record in the file of this patent:

UNITED STATES PATENTS

| Number | Name | Date |
|---|---|---|
| 1,171,502 | Burgess | Feb. 15, 1916 |
| 1,507,671 | Greene | Sept. 9, 1924 |
| 1,637,880 | Stewart | Aug. 2, 1927 |
| 1,710,614 | Furrer | Apr. 23, 1929 |
| 1,880,403 | Brink | Oct. 4, 1932 |
| 2,127,599 | Horn | Aug. 23, 1938 |
| 2,404,308 | Magdus | July 16, 1946 |

FOREIGN PATENTS

| Number | Country | Date |
|---|---|---|
| 27,020 | Great Britain | 1905 |